United States Patent [19]

Zuchtriegel

[11] Patent Number: 5,008,597
[45] Date of Patent: Apr. 16, 1991

[54] POWER NETWORK SUPPLIED HIGH-FREQUENCY LOW-PRESSURE DISCHARGE LAMP OPERATING CIRCUIT

[75] Inventor: Anton Zuchtriegel, Taufkirchen, Fed. Rep. of Germany

[73] Assignee: Patent Treuhand Gesellschaft für elektrische Gluhlampen mbH, Munich, Fed. Rep. of Germany

[21] Appl. No.: 440,776

[22] Filed: Nov. 22, 1989

[30] Foreign Application Priority Data

Dec. 7, 1988 [DE] Fed. Rep. of Germany ....... 3841227

[51] Int. Cl.$^5$ ............................................ H05B 37/02
[52] U.S. Cl. .............................. 315/209 R; 315/287; 315/DIG. 7; 315/224
[58] Field of Search ................... 315/224, 209 R, 287, 315/244, 247, 219, DIG. 7; 363/132, 39

[56] References Cited

U.S. PATENT DOCUMENTS

| | | | |
|---|---|---|---|
| 4,075,476 | 2/1978 | Pitel | 315/209 R |
| 4,398,126 | 8/1983 | Zuchtriegel | 315/244 |
| 4,438,372 | 3/1984 | Zuchtriegel | 315/224 |
| 4,563,719 | 1/1986 | Nilssen | 315/307 X |
| 4,572,989 | 2/1986 | Zuchtriegel | 315/209 R |
| 4,710,682 | 12/1987 | Zuchtriegel | 315/224 |
| 4,782,268 | 11/1988 | Fahnrick | 315/224 |
| 4,808,887 | 2/1989 | Fahnrich et al. | 315/247 |

FOREIGN PATENT DOCUMENTS 2106339 4/1983 United Kingdom .
2180418 3/1987 United Kingdom .

Primary Examiner—Eugene R. LaRoche
Assistant Examiner—Amir Zarabian
Attorney, Agent, or Firm—Frishauf, Holtz, Goodman & Woodward

[57] ABSTRACT

To reduce network harmonics upon connecting a fluorescent lamp (LP) with a power network rectifier (2) and a push-pull frequency generator (3) and a series resonance circuit (4) to the network, a harmonic filter is connected in the circuit with the fluorescent lamp. The harmonic filter includes two diode pairs (D8, D9; D10, D11) connected in forward current passing direction to the power rectifier (2). Two capacitors (C7, C8) connected to the common junction (M2) between the diodes (D8, D9) of one pair and a center common terminal (M1) between the alternately conducting transistors (T1, T2) of the push-pull frequency generator and an electrode (E1) of the lamp; and an inductance (L2) connected through a blocking capacitor (C9) to a common junction (M4) between the diodes (D10, D11) of the second pair, to provide for pumping of respectively leading and lagging reactive energy into the power network when the current wave of the a-c power supply passes through zero or null and thereby improve the overall wave shape of the power supply system.

11 Claims, 2 Drawing Sheets ced lamp, from a power network by rectifying an alternat-
POWER NETWORK SUPPLIED HIGH-FREQUENCY LOW-PRESSURE DISCHARGE LAMP OPERATING CIRCUIT Reference to related patents, the disclosures of which are hereby incorporated by reference, assigned to the assignee of the present application:

Fahnrich and Zuchtriegel U.S. Pat. No. 4,808,887.
Zuchtriegel U.S. Pat. No. 4,438,372.

The present invention relates to a circuit to operate a low-pressure discharge lamp, for example a fluorescent lamp, from a power network by rectifying an alternating current power supply and inverting the rectified energy at high frequency, without introducing harmonic distortions by feedback into the power network which exceed permissible standards or limits.

BACKGROUND

The referenced U.S. Pat. No. 4,808,887, Fahnrich and Zuchtriegel, the disclosure of which is hereby incorporated by reference, describes a circuit which includes an active harmonic filter operating in a double pump system. The active harmonic filter has a capacitor which is coupled to a center terminal between diodes of the double pump filter and a center terminal between two transistors which form the high-frequency oscillator circuit providing high frequency energy to the fluorescent lamp.

The circuit, with the filter as described in the referenced patent, ensures sufficient filtering so that the standards required by the International Electrotechnical Commission, IEC Standard 555- 2 of 1982, and amended by an amendment No. 2 of Sep. 1988 (which incorporates a prior amendment No. 1 of Oct. 1985), is met. The circuit functions as described and economically meets the IEC standards and specifications only, however, if the lamp power does not exceed 35 W. If lamps with higher lamp power are to be connected in such a circuit, or a plurality of lamps are connected together, either in parallel or in series, it has been found that the pumping capacitors must have capacity values of substantial level so that, in a push-pull amplifier, substantial switching losses will result. Thus, although the circuit functions well, the circuit losses in connection with its use render it uneconomical. Further, the network current may have a wave shape which, at the zero cross-over, has higher harmonic contents than permissible by the IEC standard, resulting in suddenly changing wave slopes rather than in essentially pure sine functions.

THE INVENTION

It is an object to provide an economically operating circuit using a push-pull frequency generator with an integrated harmonic filter, in which the harmonic filter is capable of filtering the harmonics which are not permitted to be fed into the power network by the IEC standard, even if the lamps operated by the circuit have higher power ratings or a plurality of lamps are operated from a single power generating circuit; in short, an essentially sinusoidal wave form of the current supply system should be ensured, meeting all the IEC standards. The circuit, additionally, should be simple, inexpensive to manufacture, and reliable.

Briefly, the circuit which, in general, is similar to that of the referenced Fahnrich and Zuchtriegel U.S. Pat. No. 4,808,887, is further improved by coupling an inductance in circuit with the double diode pump. In accordance with a preferred feature of the invention, a capacitor is serially connected with the inductance which, however, essentially functions only as a d-c blocking capacitor, rather than having tank circuit functions.

The circuit, using effectively a pure inductance in one branch of the double diode pump circuit, results in a lagging reactive or quadrature current portion of the pumping current which is in contrast to the leading reactive pump current portion due to the capacitor in the other branch of the active filter circuit. This permits use of small capacitors in the capacitative branches of the harmonic filters, and, during the switching pauses of the transistors, these small capacitors can be fully discharged. During the connecting phase of the transistor, short circuit discharge is avoided, thus eliminating high switching and charging-recharging losses.

DRAWINGS

FIG. 1 is an abbreviated schematic circuit diagram having an active double pumping harmonic filter; and FIG. 2 is a complete circuit diagram to operate a higher power fluorescent lamp.

DETAILED DESCRIPTION

Figure 1:
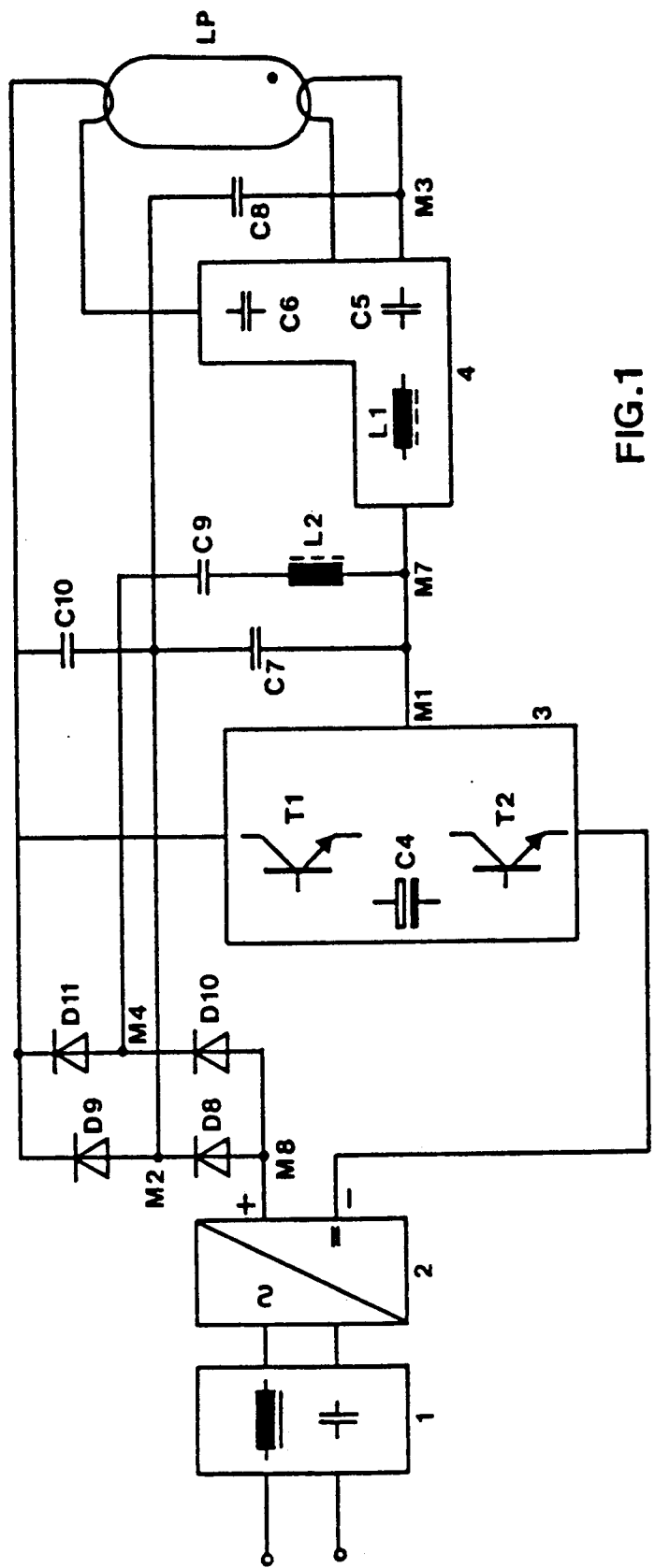

FIG. 1 shows the general principle of the circuit in accordance with the present invention, connected to a fluorescent lamp LP, for example of 58 W rating. The circuit includes a high frequency filter 1, coupled to an alternating current network supply, a network rectifier 2, a push-pull frequency generator 3 which, also, includes a smoothing capacitor C4 connected across the input terminals of the HF generator 3. The transistors T1, T2 are serially connected and, between the emitter of transistor T1 and the collector of transistor T2, a common or center tap terminal M1 is defined. The control circuit for the oscillating transistors T1, T2, is not shown in FIG. 1 and will be explained in connection with FIG. 2. A series resonance circuit 4 including an inductance L1, a capacitor C6 and a coupling capacitor C5, large with respect to capacitor C6, is connected to the fluorescent lamp LP.

The harmonic filter is formed by a series-parallel circuit, including two serially connected diodes D8, D9 with a center or common terminal M2, and a diode pair D10, D11 with a center or common terminal M4. The diodes are connected in forward current conduction between the positive terminal M8 of the network rectifier 2 and the corresponding electrode of the lamp LP. The center or common terminal M2 between the diodes D8, D9 of the first pair of diodes is a coupled by a capacitor C7 to the center or common terminal M1 between the two transistors of the push-pull frequency generator 3. Additionally, a capacitor C8 couples the center terminal with a junction M3 between the series resonance circuit 4 and the corresponding electrode of the lamp LP. A second pair of diodes D10, D11, likewise polarized in forwardly current conductive direction, is connected in parallel to the diode pair formed by diodes D8, D9. The center or common terminal M4 between the diodes D10, D11 is likewise coupled to the common junction M1 between the transistors.

In accordance with a feature of the invention, the common junction M4 between the diodes D10, D11 of the second diode pair is connected to the common junction M1 through an inductance L2. A d-c blocking capacitor C9 is serially connected with the inductance L2. The common terminal M2 between the diodes D8, D9 of the first pair is further connected by a capacitor C10 with the positive terminal of the output of the rectifier 2, that is, to the positive terminal of the smoothing of filter capacitor C4.

Figure 2:
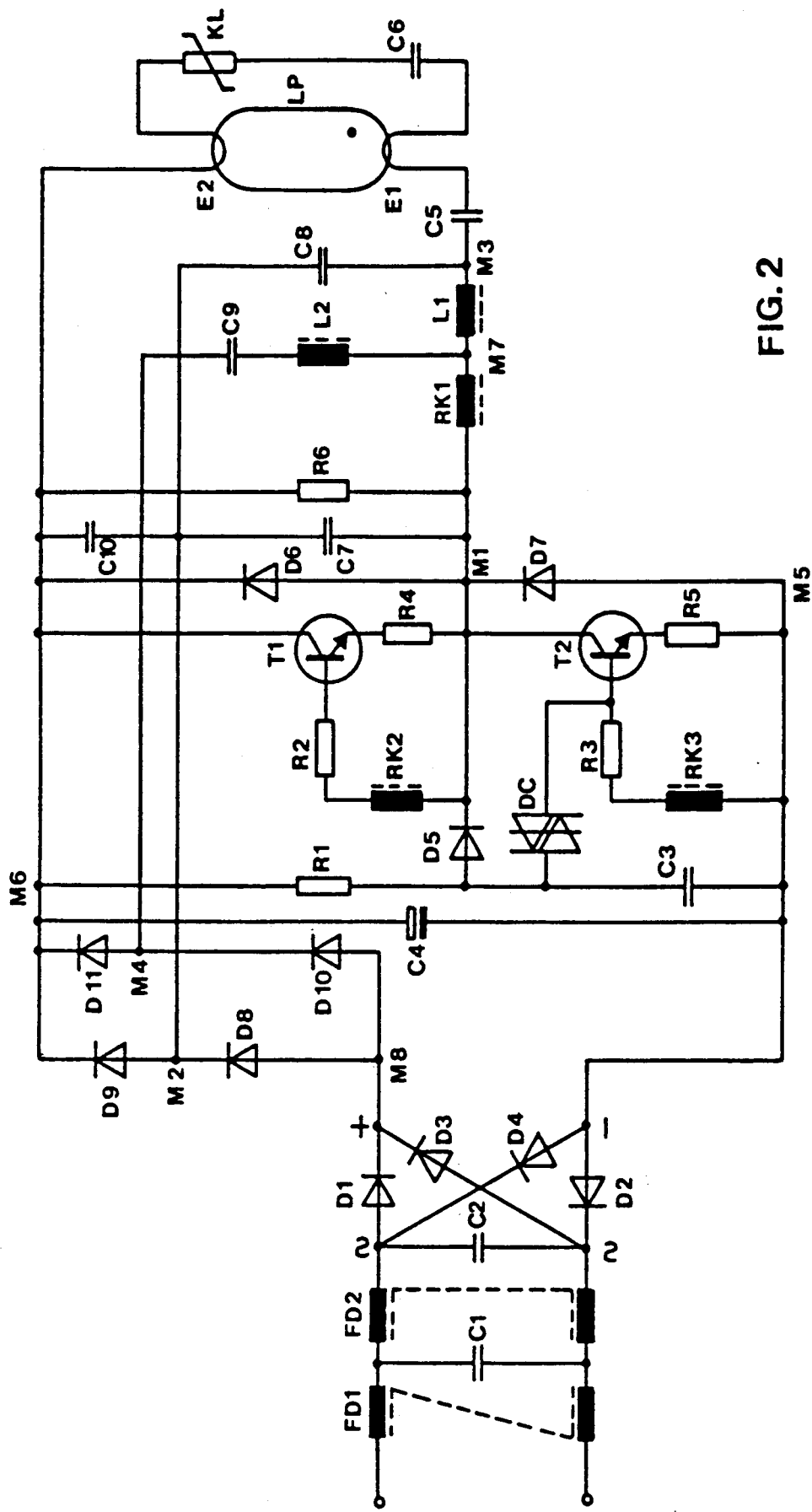

Referring now to FIG. 2, which illustrates the detailed circuit, incorporating the harmonic filter in accordance with the present invention, and connected to a single lamp of a rating in excess, for example, of 36 W; of course, the circuit is also suitable for lamps of lower power rating.

Each one of the supply lines has a non-current compensated filter choke FD1 serially connected therein. A filter capacitor C1 is connected across the output of the non-current compensated filter choke FD1. In each line, then, a current compensated filter choke FD2 is connected, the output of which has a cross connected capacitor C2 connected thereacross. This power network high-frequency filter, forming the filter 1 of FIG. 1, is connected to a standard rectifier 2, formed by the diodes D1, D2, D3, D4. The d-c output of the diode rectifier D1–D4 is bridged by an input capacitor C4 connected across the positive and negative terminals of the rectifier.

The push-pull frequency generator is self-controlling and formed by two switching transistors T1, T2, shunted by free-wheeling diodes D6, D7. The transistors T1, T2 are coupled to resistance networks R2, R3, R4, R5, and connected to a starting capacitor C3. A diode D5 and a diac DC form a starting circuit. The bases of the transistors T1, T2, connected through the resistors R2, R3, are coupled through windings RK2, RK3, forming part of an inductive oscillating transformer. Additional resistors R1, R6, are connected in circuit with the transistors to provide for starting voltage.

The inductive portion of the circuit operates on the well known feedback principle and includes the primary winding RK1 as well as the secondary windings RK2, RK3 of a toroidal transformer, in which the primary winding is connected to the center terminal M1 between the transistors T1, T2. The lamp LP has one terminal of electrode E1 connected through coupling capacitor C5 and an inductance L1, and the primary winding RK1 to the center tap or terminal M1 between the transistors T1, T2. One terminal of the other electrode E2 is connected with the positive terminal of the rectifier network. The inductance L1 forms a resonance inductance of the series resonance circuit which includes the coupling capacitor C5 and the resonance capacitor C6.

The resonance inductance L1 and the coupling capacitor C5 are connected between the primary winding RK1 of the oscillator transformer and the respective terminal of the electrode E1. The resonance capacitor C6 is connected between the terminals of the electrodes E1, E2 of the lamp LP which are remote from the terminals connected to the connection M1 between the transistors T1, T2 and the positive terminal of the rectifier. The smoothing capacitor C4 is connected across the switching paths of the transistors T1, T2, and hence to the output of the rectifier 2 through the four diodes of the two diode pairs D8, D9 and D10, D11.

The operation of the circuit is well known. It is described, for example, in literature references given to in the referenced U.S. Pat. No. 4,808,887, and additionally described in U.S. Pat. No. 4,438,372, referred to in the U.S. Pat. No. 4,808,887. Since this operation is so well known, a detailed discussion herein is no longer necessary.

A positive temperature coefficient resistor KL, serially connected between the respective electrode terminal of lamp LP and the resonance capacitor C6 provides for preheating of the electrodes E1, E2 of the lamp LP.

In accordance with a feature of the invention, a harmonic filter is provided which is formed of the combination of the two diode pairs, i.e. one pair of diodes D8, D9, with a common junction M2, and the diode pair D10, D11 with common junction M4, the capacitor C7, capacitor C8, both connected to the junction M2 and the inductance L2 connected to the junction M4 between the second diode pair formed by diodes D10, D11.

The diodes D8, D9 are polarized in d-c current conductive direction and connected to the positive terminal of the rectifier 2; the capacitor C7, connected to the junction M2, being in turn connected to the common junction M1 between the transistors T1, T2. Capacitor C8, connected to the common junction M2, is connected to a junction M3 between the resonance inductance L1 and the coupling capacitor C5. The second diode pair, formed by diodes D10, D11, likewise connected in current conductive direction, has its common junction M4 connected through a d-c blocking capacitor C9 and an inductance L2 with the junction M7, which is between the primary winding RK1 of the feedback transformer and the resonance inductance L1.

By connecting the inductance, which forms a pumping choke L2 between the primary winding RK1 of the feedback transformer and the resonance inductance L1, switching conditions of the transistor frequency generator formed by transistors T1, T2 are optimized.

Operation of the harmonic filter, connected to the push-pull frequency generator:

Phase 1: Transistor T2 becomes conductive and pulls the voltage of the junction M1 to the voltage of the junction M5, that is, the negative terminal of the rectifier, and which is also the voltage of the smoothing capacitor C4 at the negative terminal thereof. The pumping capacitors C7, C8, and the inductances L1, L2 are charged corresponding to the voltage difference of the instantaneous value of the rectified voltage at a capacitor C2 with respect to the voltage at junction M5.

Phase 2: The transistor T2 blocks. The voltages at the junctions M1, M7 and M3 are raised abruptly by the inductive voltage of the inductance L1, and thereby raise the voltages on the capacitors C7 and C8. The capacitors C7, C8 will receive a higher voltage than that of the smoothing capacitor C4 and thus can discharge into capacitor C4. The energy stored in the inductance L2 is discharged into the capacitor C4.

Phase 3: Transistor T1 becomes conductive. This raises the voltage at the junction M1 to the voltage at the junction M6, which is the junction of the upper diodes D9, D11 of the diode pairs and of the electrode E2 of the lamp LP, which corresponds to the voltage at the positive terminal of the smoothing capacitor C4. The resonance inductance L1 and the pumping inductance L2 are charged in opposite direction.

Phase 4: Transistor T1 blocks. The resonance inductance L1 can discharge in the capacitors C7 and C8. The pumping capacitors C7 and C8 are thus charged also in the region where the network voltage passes through null or zero, since the voltage of the pumping capacitors C7 and C8, in this region, is negative with respect to the rectified instantaneous value of the voltage at the capacitor C2.

Phase 5: Transistor T2 becomes conductive; the Phase 5 then corresponds to the above-identified Phase 1, and the cycle will repeat.

As can be seen from the foregoing, with each full cycle of the high-frequency operation, energy is pumped into the smoothing capacitor C4 once. The pumping capacitors C7, C8 are charged in the region of the peak values of the network voltage to the peak value of the supply voltage. Thereafter, the voltage drops and thus the charging energy drops. The smoothing capacitor C4 therefore receives during the half-wave of the network voltage energy corresponding to the instantaneous value of the rectified voltage at the rectifier input capacitor C2.

When the network voltage passes through null or zero, the voltage difference between the junction M5 and the positive terminal of the network rectifier would be null or zero; yet there will be a voltage difference, namely that which is caused by the energy stored in the resonance inductance L1 which, in this region, is pumped back via the capacitors C7 and C8, just as the stored energy of the inductance L2 is pumped back into the smoothing or filter capacitor C4.

In an operating example, a 58 W fluorescent lamp circuit designed for operation at 220 V, 50 Hz, has the components listed on the attached Table 1, forming part of this specification.

A circuit, in accordance with the present invention and having, for example, the components defined in Table 1, provided a network voltage having essentially sinusoidal wave shape, with a power network power factor in excess of 0.9, and in which the harmonic content specified by the IEC is within permissible limits.

Various changes and modifications may be made within the scope of the inventive concept.

TABLE 1

| | |
|---|---|
| FD1 | EF25 25 mH |
| FD2 | EF20, 50 mH |
| C1 | 120 nF, 250 V∼ |
| D1-D4 | rectifier bridge circuit B250, C800 |
| C2 | 220 nF, 250 V∼ |
| R1, R6 | 510 kΩ |
| C3 | 47 nF, 250 V— |
| D5 | 1N4005 |
| DC | N413M |
| R2, R3 | 8.2 Ω |
| T1, T2 | MJE13007 |
| R4, R5 | 0.39 Ω |
| D6-D11 | RGP10J |
| C6 | 10 nF, 630 V— |
| C7 | 4.7 nF 630 V— |
| RK1 | 9 turns (10 ∅ × 6 ∅ × 4) |
| RK2, RK3 | 3 turns |
| C4 | 10 µF, 450 V— |
| L1 | EF25, 1.4 mH |
| C5 | 100 nF, 250 V∼ |
| C8 | 18 nF, 1000 V— |
| C9 | 150 nF, 400 V— |
| L2 | EF20, 2 mH |
| C10 | 12nF, 400 V— |
| KL | positive temperature coefficient (PTC) resistor 65 Ω |

I claim:

1. Power network supplied high-frequency low pressure discharge lamp (LP) operating circuit having
   a power rectifier (2) having output terminals (M8, M5);
   a high-frequency oscillator circuit (3) including a push-pull transistor frequency generator having two alternately conducting transistors (T1, T2) connected to define a common junction (M1) between the transistors, a feedback circuit (RK1, RK2, RK3) coupled to the transistors, and a smoothing capacitor (C4) coupled across both transistors;
   a series resonance circuit (4) having a series inductance (L1) and a series capacitor (C6) coupled to the lamp, to provide starting energy thereto;
   a first circuit means connecting a first electrode (E1) of the lamp (LP) through the series inductance (L1) with said common junction (M1) between said transistors;
   a second circuit means connecting the second electrode (E2) of the lamp with one of said output terminals (M8) of the power rectifier; and
   an active harmonic filter including
      two parallel series connected circuits, each of which series circuits is formed by a pair of serially connected diodes (D8, D9; D10, D11) coupled to the power rectifier and polarized in forward direction with respect to the output voltage from the power rectifier,
   and comprising, in accordance with the invention, the combination of
   a first capacitor (C7) connected to a first common diode junction (M2) between the diodes (D8, D9) of the first pair and to said common junction (M1) between said transistors;
   a second capacitor (C8) connected also to the first common diode junction (M2) and to a junction (M3) between said inductance (L1) and the first electrode (E1) of the lamp (LP); and
   a pumping inductance (L2) connected to a second common diode junction (M4) between the diodes (D10, D11) of the second diode pair, and further connected to said common junction (M1) between said transistors (T1, T2).

2. The circuit of claim 1, further including a d-c blocking capacitor (C9) serially connected between the pumping inductance (L2) and said second common diode junction (4).

3. The circuit of claim 1, further including a capacitor (C10) connected between the first diode junction (M2) and one of the terminals of the smoothing capacitor (C4).

4. The circuit of claim 3, wherein said further capacitor (C10) is coupled to the positive terminal of the smoothing capacitor (C4).

5. The circuit of claim 1, further including a coupling junction (M7) connected between said common junction (M1) of said transistors (T1, T2) and the first electrode (E1) of the lamp;
   and wherein said pumping inductance (L2) is connected to said coupling junction.

6. The circuit of claim 5, wherein the feedback circuit of said high-frequency oscillator circuit includes a feedback transformer (RK1, RK2, RK3) having a winding (RK1) serially connected between said common junction (M1) of said transistors (T1, T2) and said first electrode (E1) of the lamp; and
   said coupling junction (M7) is located between said winding (RK1) and the first electrode of the lamp.

7. The circuit of claim 6, wherein said coupling junction (M7) is connected between said winding (RK1) of the feedback transformer and said series inductance (L1).

8. The circuit of claim 5, further including a d-c blocking capacitor (C9) serially connected between the pumping inductance (L2) and said second common diode junction (M4).

9. The circuit of claim 5, further including a capacitor (C10) connected between the first diode junction (M2) and one of the terminals of the smoothing capacitor (C4).

10. The circuit of claim 9, further including a d-c blocking capacitor (C9) serially connected between the pumping inductance (L2) and said second common diode junction (M4).

11. The circuit of claim 9, wherein said further capacitor (C10) is coupled to the positive terminal of the smoothing capacitor (C4).

* * * * *